United States Patent [19]

Ho et al.

[11] Patent Number: 4,901,263

[45] Date of Patent: Feb. 13, 1990

[54] VERSATILE DATA SHIFTER WITH STICKY BIT GENERATION CAPABILITY

[75] Inventors: Chung-Yih Ho, Niskaynua; Karl J. Molnar, Clifton Park; Daniel A. Staver, Scotia, all of N.Y.

[73] Assignee: General Electric Company, Schenectady, N.Y.

[21] Appl. No.: 243,359

[22] Filed: Sep. 12, 1988

[51] Int. Cl.⁴ ............................................. G06F 7/38
[52] U.S. Cl. ............................................ 364/715.08
[58] Field of Search ............. 364/715.08, 715.01, 364/200

[56] References Cited

U.S. PATENT DOCUMENTS

| 4,583,197 | 4/1986 | Chappell et al. | 364/715.08 |
| 4,665,538 | 5/1987 | Machida | 364/715.08 |
| 4,782,457 | 11/1988 | Cline | 364/715.08 |

OTHER PUBLICATIONS

D. Gajski et al., "High Speed Masking Rotator", Digital Processes, 1978, pp. 67–81.
Introduction to VLSI Systems, C. Mead & L. Conway, pp. 157–163, Addison Wesley Publishing Co., Reading MA, Menlo Park, CA, London etc., 1980.

Primary Examiner—Gary V. Harkcom
Assistant Examiner—Long T. Nguyen
Attorney, Agent, or Firm—Allen L. Limberg; James C. Davis, Jr.; Paul R. Webb, II

[57] ABSTRACT

A barrel-shift data shifter structure is modified to segregate switches in a switching matrix included therein into those switches as participate in a simple shift as well as in a barrel shift and those switches used only in a barrel shift. The former set of switches is controlled by shift control signals alone, and the latter set of switches responds to shift control signals and to the presence or absence of a rotation enable signal. The number of switches required is substantially smaller than required in a barrel shifter followed in cascade by a simple data shifter. Preferably provision is made for sticky bit generation. The sticky bit is the LOGIC OR response to all bits shifted to less significance than output data.

3 Claims, 4 Drawing Sheets

VERSATILE DATA SHIFTER WITH STICKY BIT GENERATION CAPABILITY

The invention relates to data shifters for digital computation in which bits in each successive data word are processed in parallel.

BACKGROUND OF THE INVENTION

In simple left-shift or right-shift operation, bits shifted beyond the normal data range are discarded, and the bit places in the normal data range that are vacated during the shift are filled with all ZEROs or all ONEs. In a barrel-shift operation to the right or to the left, the bits shifted out of the normal data range are used to fill the vacated bit places. General purpose shifters which can be programmed to provide any of these types of shift to any number of bits are useful, for example, in scan line processors of image data and in multiply/accumulate circuits, particularly those used for handling mantissa normalization and de-normalization. To provide a choice of either simple-shift or barrel-shift operation to as many bits as desired, the practice has been to cascade the two types of programmable data shifters. This is inefficient of hardware and introduces complexity into providing connections for controlling shift.

Such cascading also complicates sticky bit generation. The sticky bit is the LOGIC OR of all the bits shifted out during simple right-shift. The sticky bit is used for maintaining computational accuracy in floating-point-arithmetic data normalization procedures.

Circuitry to provide versatility as to choice among simple-shift left, simple-shift right, barrel-shift left and barrel-shift right operations was sought that had sufficient regularity of circuit architecture as to be suitable for use in integrated-circuit structures laid out with a silicon compiler. Furthermore, that regularity of circuit architecture would have not to be disrupted by making provision for sticky bit generation.

The inventors perceived that a barrel-shift data shifter could be modified by segregating switches in the switching matrix into those switches as would participate in a simple shift as well as a barrel shift and those switches that would participate only in the barrel shift. The former set of switches is caused to be controlled just by shift control signals and the latter set of switches is caused to be controlled by a rotation enable signal as well as by shift control signals. Accordingly simple shift as well as barrel shift can be provided for without having to use a further switching matrix, which further switching matrix is required when a barrel shifter and a simple shifter are cascaded.

SUMMARY OF THE INVENTION

A data shifter embodying the invention is for binary data having a plurality n in number of bit places. The data shifter includes a first plurality of binary-place busses individually identified by consecutive ordinal numbers zeroeth through $(n-1)^{th}$ and a second plurality of further binary-place busses also individually identified by consecutive ordinal numbers zeroeth through $(n-1)^{th}$.

During data shifts towards increased significance, a plurality of input selectors identified by consecutive ordinal numbers zeroeth through $(n-1)^{th}$ select respective binary places of input data to binary-place busses in the first plurality thereof that are identified by corresponding numbers, and a plurality of output selectors identified by consecutive ordinal numbers zeroeth through $(n-1)^{th}$ select respective binary places of output data from binary-place busses in the second plurality thereof that are identified by corresponding numbers.

During data shifts towards decreased significance, the input selectors select respective binary places of input data to binary-place busses in the second plurality thereof that are identified by corresponding numbers, and the output selectors select respective binary places of output data from binary-place busses in the first plurality thereof that are identified by corresponding numbers.

A plurality of shift control busses are used that are identified by consecutive ordinal numbers zeroeth through $(n-1)^{th}$ and are associated with both simple and barrel shift of zero to $(n-1)$ bits, respectively. A plurality of rotation control busses are used that are identified by consecutive ordinal numbers first through $(n-1)^{th}$ and are associated with barrel shifts of one to $(n-1)$ bits, respectively. A shift command is applied to a selected one of the shift control busses. If a rotation enable signal is present, as is the case only during barrel shifting, a rotation control command is supplied to the correspondingly numbered rotation control bus.

A respective set of switches, n in number, is associated with the zeroeth shift control bus and responds to a shift command appearing thereupon to selectively connect respective binary-place busses in the first and second pluralities thereof that are identified by corresponding numbers. A respective set of further switches, n in number, is associated with each set of shift control and rotation control busses identified by the same ordinal number from first to $(n-1)^{th}$ to selectively connect respective ones of the binary-place busses in said first plurality thereof to respective ones of further binary-place busses in said second plurality. The binary-place bus connected to in the second plurality has an ordinal number equal to the sum in modulo n arithmetic of the ordinal number identifying the binary-place bus in the first plurality that is connected from, plus the number of bits of shift associated with the shift control and rotation control busses associated with that set of switches. Those switches selectively connecting a binary-place bus in the first plurality to a binary-place bus in the second plurality that is identified by at least as high an ordinal number are controlled by signal on the shift control bus therewith associated. Those switches selectively connecting a binary-place bus in the first plurality to a binary-place bus in the second plurality that identified b a lower ordinal number are controlled by the rotation control bus therewith associated.

In data shifters that are preferred embodiments of the invention, sticky bit generation is provided for. The sticky bit is the LOGIC OR response to all data bits shifted to less significance than output data.

BRIEF DESCRIPTION OF THE DRAWING

FIGURE 1a is a schematic diagram of the data shifter per se; and FIG. 1b is a schematic diagram of the sticky bit generation circuitry used therewith.

DETAILED DESCRIPTION

Figure 1A:
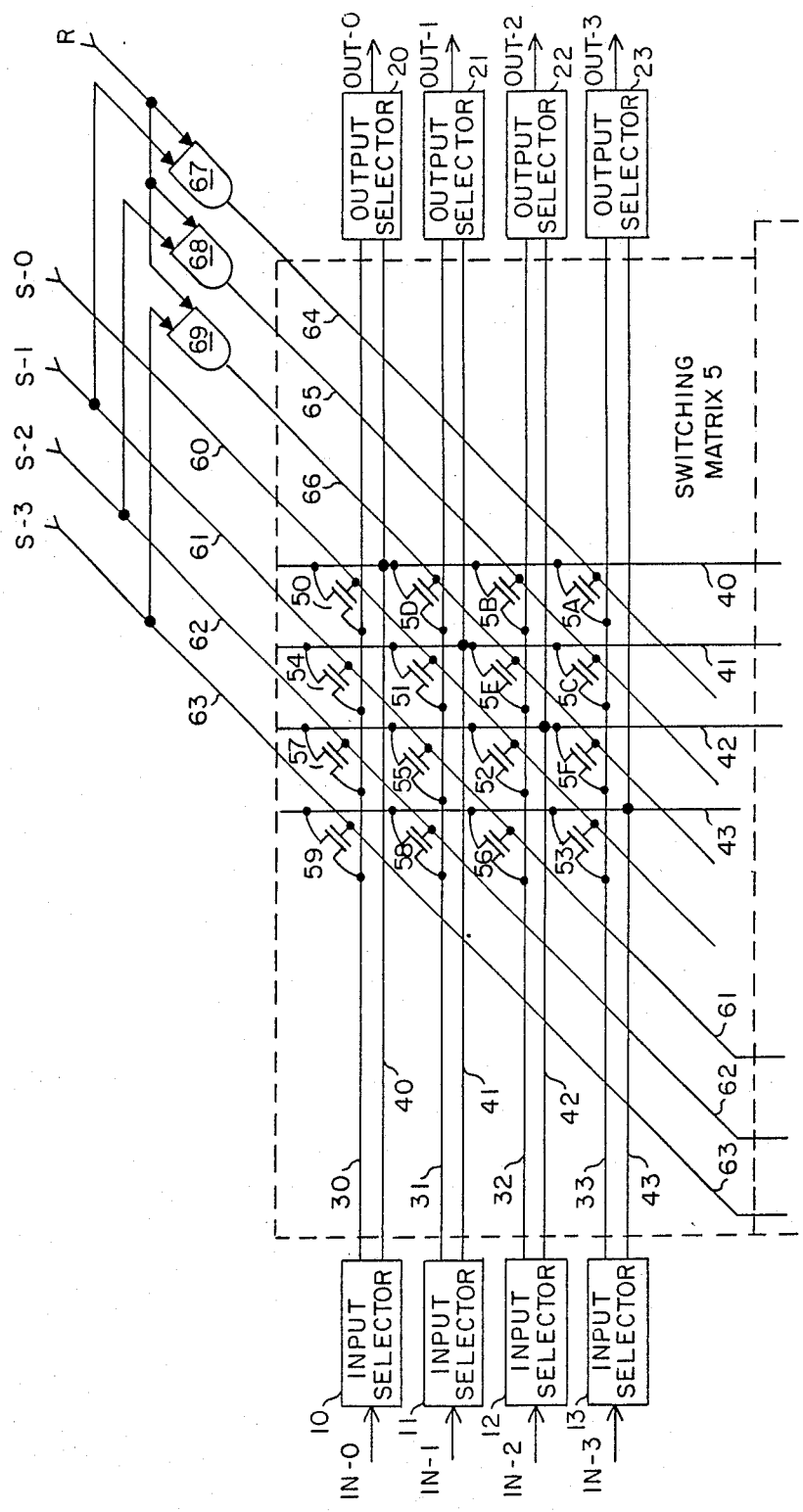
FIGS. 1a and 1b when arranged in upper and lower positions respective to each other together form a schematic diagram of a shifter embodying the invention, which shifter accommodates four-bit-wide data and exemplifies a family of shifters that accommodate different bit widths of data and can be assembled from basic building-block cells.

The FIG. 1a shifter is for four-bit-wide input data, but this type of shifter can be expanded to handle wider bit-width input data. The $2^0$, $2^1$, $2^2$, and $2^3$ bit places of the four-bit-wide input signal—i.e., IN-0, IN-1, IN-2 and IN-3 components, respectively, of the input signal—are applied to the input connections of input selectors 10, 11, 12 and 13, respectively. Output selectors 20, 21, 22 and 23 are to supply the $2^0$, $2^1$, $2^2$ and $2^3$ bit places of a four-bit-wide output signal, respectively—i.e. OUT-0, OUT-1, OUT-2 and OUT-3 components, respectively, of the output signal. During a shift left the input selectors 10, 11, 12 and 13 select to busses 30, 31, 32 and 33, respectively; and output selectors 20, 21, 22 and 23 select from busses 40, 41, 42 and 43 respectively. During a shift right the input selectors 10, 11, 12 and 13 select to busses 40, 41, 42 and 43, respectively; and output selectors 20, 21, 22 and 23 select from busses 30, 31, 32 and 33, respectively. That is, for a data word n bits wide there are n input selectors, n output selectors and a pair of busses to be used in connecting each input selector to a corresponding output selector.

These busses are arranged with $n^2$ switch transistors in a switching matrix 5. In FIG. 1a, where n=4, there are $4^2$ or sixteen switch transistors 50, 51, 52, 53, 54, 55, 56, 57, 58, 59, 5A, 5B, 5C, 5D, 5E and 5F in matrix 5. Those transistors typically are field-effect transistors of enhancement-mode insulated-gate type, and each switch transistor will hereafter be referred to as being an "FET". These FETs are n-channel type here, to accord with the sticky bit generation apparatus of FIG. 1b. Logic ONE level will be presumed to be a positive potential +V, and logic ZERO level will be presumed to be ground. A ONE is applied to one of the shift control connections S-0, S-1, S-2, S-3 and ZEROs are applied to the others to determine the number of bits of shift to be provided by the FIG. 1a shifter. This number equals the numerical suffix in the call-out of the shift control connection to which ONE is applied. A shift control bus 60 connects the shift control connection S-0 to the gate electrodes of FETs 50, 51, 52 and 53. A shift control bus 61 connects the shift control connection S-1 to the gate electrodes of FETs 54, 55 and 56. A shift control bus 62 connects the shift control connection S-2 to the gate electrodes of FETs 57 and 58. And a shift control bus 63 connects the shift control connection S-3 to the gate electrode of FET 59.

FETs 50–59 control the generation of simple-shift during which the channels of FETs 5A–5F are non-conducting. During a simple-shift a ZERO is supplied to a rotation enable connection R, which connects to first input ports of two-input-port AND gates 67, 68 and 69. In response AND gates 67, 68 and 69 supply ZEROs at their output ports to rotation control busses 64, 65 and 66 respectively. The gate electrode of FET 5A connects to rotation control bus 64; the gate electrodes of FETs 5B and 5C connect to rotation control bus 65, and the gate electrodes of FETs 5D, 5E and 5F connect to rotation control bus 66. The ZEROs on rotation control busses 64, 65 and 66 during simple-shift are responsible for FETs 5A–5F being non-conducting.

The second input ports of AND gates 67, 68 and 69 connect to shift control busses 61, 62 and 63, respectively. During a barrel-shift a ONE is applied to the first input port of AND gates 67, 68 and 69. Rotation control busses 64, 65 and 66 accordingly assume the same logic levels as are applied to shift control busses 61, 62 and 63 respectively.

During a non-shift or zero-bit shift, either leftward or rightward, shift control connection S-0 receives a ONE and shift control connections S-1, S-2 and S-3 receive respective ZEROs. Since S-1, S-2 and S-3 receive ZEROs, AND gates 67, 68 and 69 respond with ZERO output levels applied to rotation control busses 64, 65 and 66 to render the channels of FETs 5A–5F nonconducting. The ZEROs applied via S-1, S-2, S-3 to shift control busses 61–63 render the channels of FETs 54–59 nonconducting. The ONE applied via connection S-1 to shift control bus 60 conditions the channel of FET 50 to conduct to connect busses 30 and 40 together. The bit IN-0 selected by input selector 10 to one of these busses 30 and 40 is therefore applied to the other of these busses from which output selector 20 makes its selection of OUT-0. The ONE on shift control bus 60 conditions the channel of FETs 51 to conduct to connect busses 31 and 41 together. The bit IN-1 selected by input selector 11 to one of these busses 31 and 41 is therefore applied to the other of these busses from which output selector 21 makes its selection of OUT-1. The ONE on shift control bus 60 conditions the channel of FETs 52 to conduct to connect busses 32 and 42 together. The bit IN-2 selected by input selector 12 to one of these busses 32 and 42 is therefore applied to the other of these busses, from which output selector 20 makes its selection of OUT-2. The ONE on shift control bus 60 conditions the channel of FET 52 to conduct to connect busses 33 and 43 together. The bit IN-3 selected by input selector 13 to one of these busses 33 and 43 is therefore applied to the other of these busses from which output selector 23 makes its selection of OUT-3.

During a one-bit shift, either leftward or rightward, shift control connection S-1 receives a ONE applied to shift control bus 61; and shift control connections S-0, S-2 and S-3 receive respective ZEROs that are applied to the shift control busses 60, 62 and 63 respectively. The ZEROs on shift control busses 60, 62 and 63 as applied to the gate electrodes of FETs 50–53 and 57–59 condition their channels to be nonconducting. The ZEROs received at S-2 and S-3 connections ar also applied to the second input ports of AND gates 68 and 69 to cause their respective output signals applied to rotation control busses 65 and 66 respectively both to be ZEROs. These ZEROs are applied to the gate electrodes of FETs 5B–5F to condition their channels to be nonconducting.

The ONE at shift control connection S-1 is applied via shift control bus 61 to the gate electrodes of FETs 54–56 to condition their channels to be conductive. The conduction of FET 54 channel connects together busses 30 and 41. During a shift left, the input bit IN-0 selected to bus 30 by input selector 10 is thus applied to bus 41 to be selected as OUT-1 by output selector 21. During a shift right, however, the input bit IN-1 selected to bus 41 by input selector 11 is thus applied to bus 30 to be selected as OUT-0 by output selector 20. The conduction of FET 55 channel connects together busses 31 and 42. During a shift left, the input bit IN-1 selected to bus 31 by input selector 11 is thus applied to bus 42 to be selected as OUT-2 by output selector 22. During a shift right, however, the input bit IN-2 selected to bus 42 by input selector 12 is thus applied to bus 31 to be selected as OUT-1 by output selector 21. The conduction of FET 56 channel connects together busses 32 and 43. During a shift left, the input bit IN-2 selected to bus 32 by input selector 12 is thus applied to bus 43 to be selected as OUT-3 by output selector 23. During a shift right, however, the input bit IN-3 selected to bus 43 by input selector 13 is thus applied to bus 32 to be selected as OUT-2 by output selector 22.

During a simple-shift by one bit, the rotation enable connection R receives a ZERO, so AND gate 76 supplies a ZERO to rotation control bus 64 and thence to the gate electrode of FET 5A to condition its channel to be nonconducting. During a barrel shift by one bit, however, the rotation enable connection R receives a ONE. This ONE applied to the first input connection of AND gate 67 and the ONE supplied the second input connection of AND gate 67 from shift control connection S-1 together condition AND gate 67 to place a ONE on rotation control bus 64. This ONE applied to the gate electrode of FET 5A conditions its channel to conduct. The conduction of FET 5A channel connects together busses 33 and 40. During a barrel-shift left, the input bit IN-3 selected to bus 33 by input selector 13 is thus applied to bus 40 to be selected as OUT-0 by output selector 20. During a barrel-shift right, however, the input bit IN-0 selected to bus 40 by input selector 11 is thus applied to bus 33 to be selected as OUT-3 by output selector 23.

During a two-bit shift, either leftward or rightward, shift control connection S-2 receives a ONE that is applied to shift control bus 62; and shift control connections S-0, S-1 and S-3 receive respective ZEROs that are applied to the shift control busses 60, 61 and 63 respectively. The ZEROs on shift control busses 60, 61 and 63 as applied to the gate electrodes of FETs 50-56 and 59 condition their channels to be nonconducting. The ZEROs received at S-1 and S-3 connections are also applied to the second input ports of AND gates 67 and 69 to cause their respective output signals applied to rotation control busses 64 and 66 respectively both to be ZERO. These ZEROs are applied to the gate electrodes of FETs 5A and 5D-5F to condition their channels to be non-conductive.

The ONE at shift control connection S-2 is applied via shift control bus 62 to the gate electrodes of FETs 57 and 58 to condition their channels to conduct. The conduction of FET 57 channel connects together busses 30 and 42. During a shift left, the input bit IN-0 selected to bus 30 by input selector 10 is thus applied to bus 42 to be selected as OUT-2 by output selector 22. During a shift right, however, the input bit IN-2 selected to bus 42 by input selector 12 is thus applied to bus 30 to be selected as OUT-0 by output selector 20. The conduction of FET 58 channel connects together busses 31 and 43. During a shift left, the input bit IN-1 selected to bus 31 by input selector 11 is thus applied to bus 43 to be selected as OUT-3 by output selector 23. During a shift right, however, the input bit IN-3 selected to bus 43 by input selector 13 is thus applied to bus 31 to be selected as OUT-1 by output selector 21.

During a simple-shift by two bits, the rotation enable connection R receives a ZERO, so AND gate 68 supplies a ZERO to rotation control bus 65 and thence to the gate electrodes of FETs 5B and 5C to condition their channels to be non-conducting. During a barrel-shift by two bits, however, the rotation enable connection R receives a ONE. This ONE applied to the first input connection of AND gate 68 and the ONE supplied the second input connection of AND gate 68 from shift control connection S-2 together condition AND gate 68 to place a ONE on rotation control bus 65. This ONE applied to the gate electrodes of FETs 5B and 5C conditions their channels to conduct. The conduction of FET 5B channel connects together busses 32 and 40. During a barrel-shift left, the input bit IN-2 selected to bus 32 by input selector 12 is thus applied to bus 40 to be selected as ONE-0 by output selector 20. During a barrel-shift right, however, the input bit IN-0 selected to bus 40 by input selector 10 is thus applied to bus 32 to be selected as OUT-2 by output selector 22. The conduction of FET 5C channel connects together busses 33 and 41. During a barrel-shift left, the input bit IN-3 selected to bus 33 by input selector 13 is thus applied to bus 41 to be selected as OUT-1 by output selector 21. During a barrel-shift right, however, the input bit IN-1 selected to bus 41 by input selector 11 is thus applied to bus 33 to be selected as OUT-3 by output selector 23.

During a three-bit shift, either leftward or rightward, shift control connection S-3 receives a ONE applied to shift control bus 63; and shift control connections S-0, S-1 and S-2 receive respective ZEROs applied to the shift control busses 60, 61 and 62. These ZERO as applied to the gate electrodes of FETs 50-58 condition their channels to be nonconducting. The ZEROs received at S-2 and S-3 connections are also applied to the second input ports of AND gate 67 and 68 to cause their respective output signals applied to rotation control busses 64 and 65, respectively, both to be ZERO. These ZEROs are applied to the gate electrodes of FETs 5A-5C to condition their channels to be nonconducting.

The ONE at shift control connection S-3 is applied via shift control bus 63 to the gate electrode of FET 59 to condition its channel to conduct. The conduction of FET 59 channel connects together busses 30 and 43. During a shift left, the input bit IN-0 selected to bus 30 by input selector 10 is thus applied to bus 43 to be selected as OUT-3 by output selector 23. During a shift right, however, the input bit IN-3 selected to bus 43 by input selector 13 is thus applied to bus 30 to be selected as OUT-0 by output selector 20.

During a simple-shift by three bits, the rotation enable connection R receives a ZERO, so AND gate 69 supplies a ZERO to rotation control bus 66 and thence to the gate electrodes of FETs 5D-5F to condition their channels to be nonconducting. During a barrel-shift by three bits, however, the rotation enable connection R receives a ONE. This ONE applied to the first input connection of AND gate 69 and the ONE supplied to the second input connection of AND gate 69 from shift control connection S-3 together condition AND gate 69 to place a ONE on rotation control bus 66. This ONE applied to the gate electrodes of FETs 5D-5F conditions their channels to conduct.

The conduction of FET 5D channel connects together busses 31 and 40. During a shift left, the input bit IN-1 selected to bus 31 by input selector 11 is thus applied to bus 40 to be selected as OUT-0 by output selector 20. During a shift right, however, the input bit IN-0 selected to bus 40 by input selector 10 is thus applied to bus 31 to be selected as OUT-1 by output selector 21.

The conduction of FET 5E channel connects together busses 32 and 41. During a shift left, the input bit IN-2 selected to bus 32 by input selector 12 is thus applied to bus 41 to be selected as OUT-1 by output selector 21. During a shift right, however, the input bit IN-1 selected to bus 41 by input selector is thus applied to bus 32 to be selected as OUT-2 by output selector 22.

The conduction of FET 5F channel connects together busses 33 and 42. During a shift left, the input bit IN-3 selected to bus 33 by input selector 13 will thus be applied to bus 42 to be selected as OUT-2 by output selector 22. During a shift right, however, the input bit IN-2 selected to bus 42 by input selector 12 will thus be applied to bus 33 to be selected as OUT-3 by output selector 23.

Figure 2:
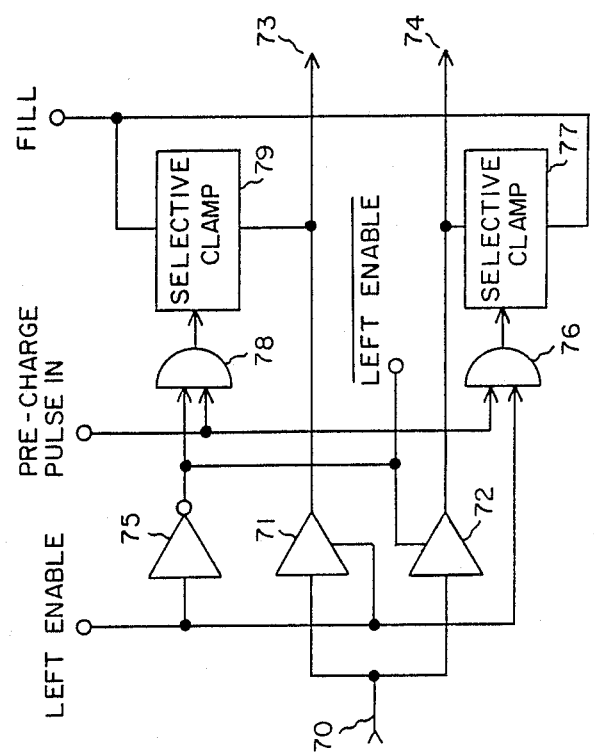
FIG. 2 is a schematic diagram of an input selector for use in the FIG. 1a shifter.

FIG. 2 shows an input selector such as 10, 11, 12 or 13 in greater detail. Its input connection 70, receptive of a bit in the signal to be shifted, supplies that bit as input signal to selectively enabled buffer amplifiers 71 and 72. When buffer amplifier 71 is enabled, it supplies its response to this bit to an output connection 73 of the input selector; and when buffer amplifier 72 is enabled, it supplies its response to this bit to an output connection 74 of the input selector. Only one of the buffer amplifiers 71 and 72 is enabled at a time, in response to the condition of a LEFT ENABLE command signal supplied to a connection LE and thencefrom applied as input signal to a logic inverter 75.

LEFT ENABLE command signal is a ONE during a shift left operation, being applied directly to the control connection of buffer amplifier 71 to enable it to generate response at output connection 73 to the bit on input connection 70. Logic inverter 75 responds to the ONE at its input connection to supply a ZERO at its output connection to the control connection of buffer amplifier 72, disabling amplifier 72. Amplifier 72 output impedance rises when disabled to permit clamping of output connection 74 to proceed unimpeded. This clamping occurs when a precharge pulse signal applied to connection PC goes to ONE just prior to output signal being sampled from the FIG. 1 shifter. The precharge pulse signal and the LEFT ENABLE command signal are applied to respective ones of the input ports of an AND gate 76 to generate a ONE. This ONE activates clamp circuitry 77 to clamp output connection 74 to the ZERO or ONE supplied to the connection FILL.

LEFT ENABLE command signal is a ZERO during a shift right operation, disabling buffer amplifier 71 and causing logic inverter 75 output signal to be a ONE. This ONE applied to the control connection of buffer amplifier 72 enables it to generate response at output connection 74 to the bit on input connection 70. An AND gate 78 responds to this ONE and the precharge pulse going to ONE to activate clamp circuitry 79 to clamp output connection 73 to the ZERO or ONE supplied to the connection FILL. Amplifier 71 output impedance rises when disabled to permit this clamping to proceed unimpeded.

Figure 3:
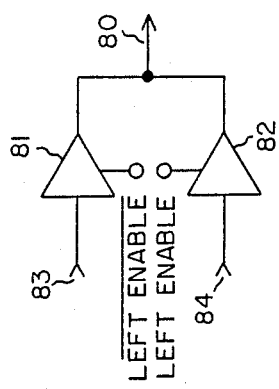
FIG. 3 is a schematic diagram of an output selector for use in the FIG. 1a shifter.

FIG. 3 shows an output selector such as 20, 21, 22, or 23 in greater detail. An output connection 80 of the output selector receives the responses of selectively enabled buffer amplifiers 81 and 82.

During shift right, buffer amplifier 81 is enabled, when LEFT ENABLE signal applied thereto (e.g. from logic inverter 75) is a ONE, to apply to output connection 80 response to the bit on an input connection 83. The LEFT ENABLE signal during shift right is a ZERO, disabling buffer amplifier 82.

During shift left, LEFT ENABLE signal is a ZERO, disabling buffer amplifier 81. LEFT ENABLE signal during shift left is a ONE enabling buffer amplifier 82 to apply to output connection 80 response to the bit on input connection 84.

Figure 4:
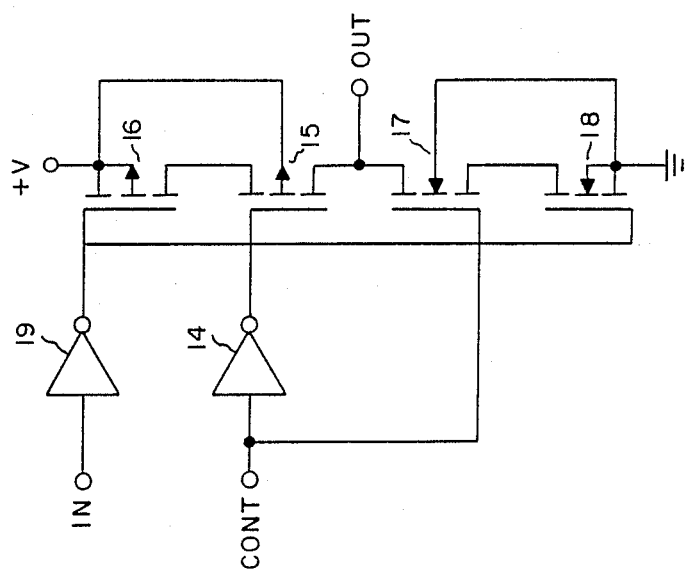
FIG. 4 is a schematic diagram of a selectively enabled amplifier useful in constructing both the FIG. 2 input selector and the FIG. 3 output selector.

FIG. 4 shows a configuration suitable for realizing each of selective buffer amplifiers 71, 72, 81, 82. ZERO and ONE logic levels are presumed to correspond to +V volts and ground (or zero) volts, respectively.

When a ONE is applied via a control terminal CONT to the input connection of a logic inverter 14, its output connection responds with a ZERO. The ground potential thus applied to the gate electrode of p-channel FET 15 conditions its channel for conducting any drain current of the p-channel FET 16 receptive of +V source potential. The ONE at control terminal CONT biases the gate electrode of an n-channel insulated-gate field effect transistor 17 to condition its channel for conducting any drain current of a grounded-source-electrode n-channel FET 18. With the FETs 15 and 17 respectively in cascode with FETs 16 and 18 being so conditioned for conduction, p-channel FET 16 and n-channel FET 18 function like the well-known complementary metal-oxide-semiconductor (CMOS) logic inverter to supply to a terminal OUT inverted response to the bit applied to their gate electrodes from a previous logic inverter 19, which supplies inverted response to a bit supplied its input connection via a terminal IN. The FIG. 4 selectively enabled buffer amplifier thus responds to a ONE at its terminal CONT to supply at its terminal OUT a non-inverted response to a bit supplied to its terminal IN.

When a ZERO is applied to terminal CONT, the gate electrode of FET 17 is no longer forward-biased, as required to condition the channel of FET 18 to be conductive. Inverting amplifier 14 responds to the ZERO to apply a ONE of +V potential to the gate electrode of FET 15, removing the forward bias required to condition the channel of FET 16 to be conductive. The non-conduction of the channels of FETs 15 and 17 disconnects terminal OUT from preceding circuitry and raises the output impedance of the FIG. 4 selectively enabled buffer amplifier as presented at terminal OUT. This facilitates the selective clamping of the bus connecting from terminal OUT.

Figure 5:
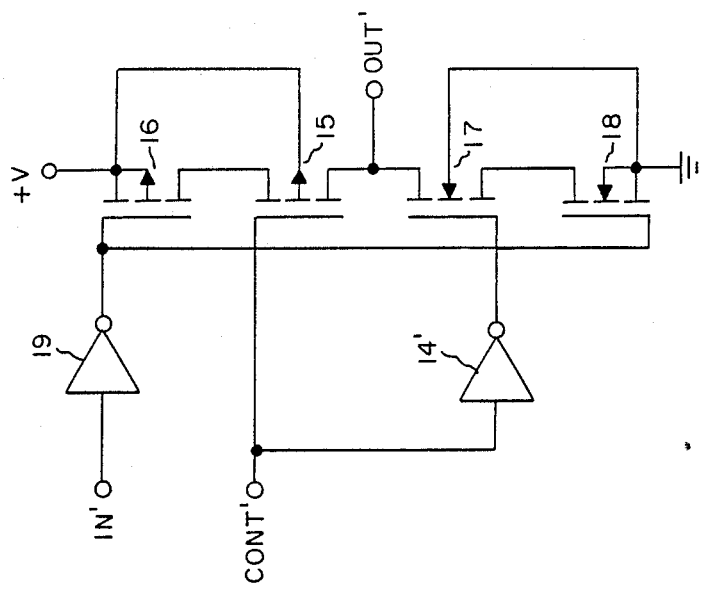
FIG. 5 is a schematic diagram of a selectively enabled amplifier useful in constructing variants of the FIG. 2 input selector and the FIG. 3 output selector.

FIG. 5 shows an alternative type of selectively enabled buffer amplifier, which is enabled by a ZERO applied to its terminal CONT'. This modification of the FIG. 4 buffer amplifier is accomplished by using a logic inverter 14 between terminal CONT' and the gate electrode of FET 17, rather than using a direct connection there, and by using a direct connection between terminal CONT' and the gate electrode of FET 15, rather than using a logic inverter there. A FIG. 5 buffer amplifier can be used instead of selectively enabled buffer amplifiers 72 and 81 of FIG. 4 type and arranged to respond to LEFT ENABLE rather than LEFT ENABLE signal, to reduce the number of separate signals that need to be routed. (Alternatively, of course, all the selectively enabled buffer amplifiers could be made to respond to LEFT ENABLE signal, rather than LEFT ENABLE signal, in order to reduce the number of separate signals that need to be routed.

The selective clamp 77 or 79 is essentially the same structure as shown in FIG. 4. The terminal IN connects from the connection FILL. The terminal CONT connects from the AND gate 76 or 78. The terminal OUT of the selective clamp connects to the buffer amplifier terminal OUT being selectively clamped. The similarity of the selective clamp portions of the input selector configuration and portions of the output selector configuration facilitates their being laid out from basic building blocks using a silicon compiler.

Figure 1B:
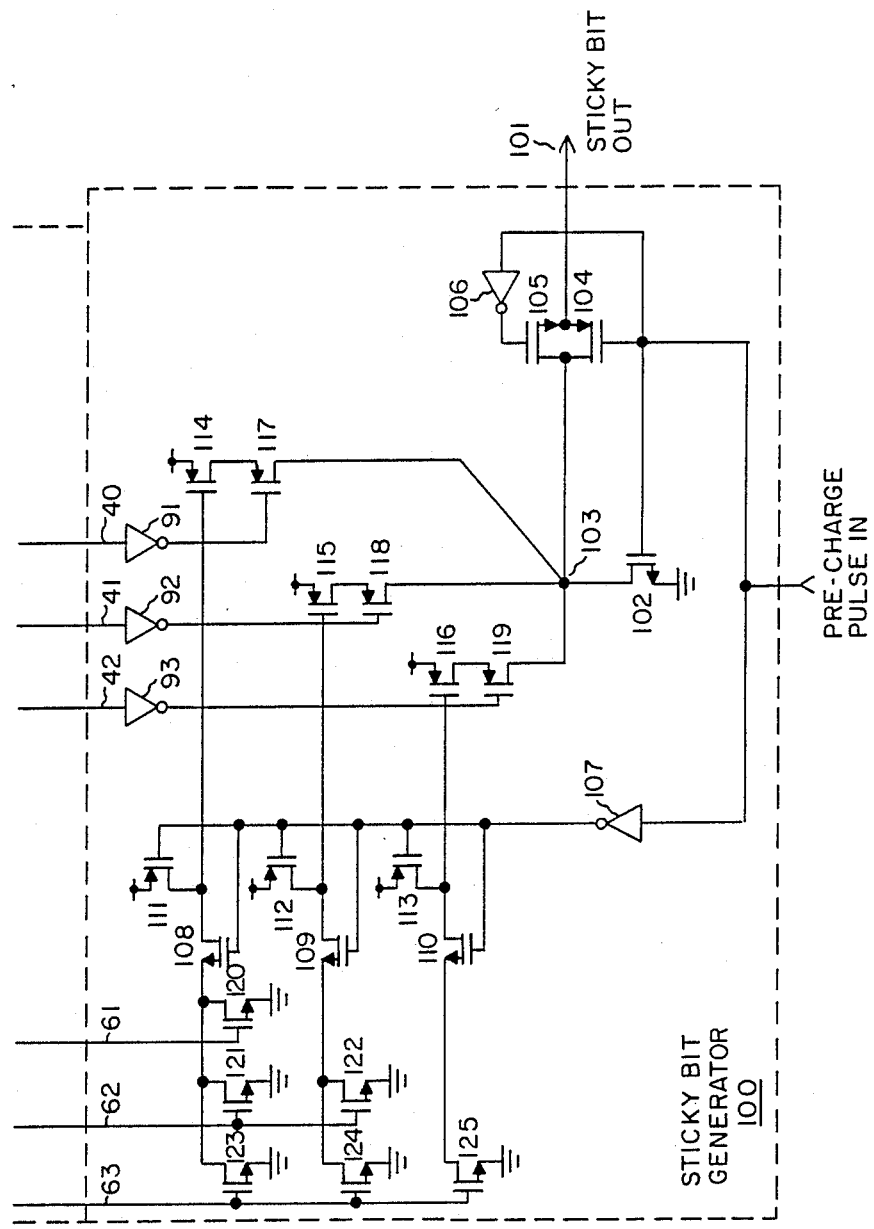

FIG. 1b will now be considered in regard to the generation of the sticky bit. The top of FIG. 1b interfaces with the bottom of FIG. 1a with busses 40, 41, 42, 61, 62 and 63 crossing the boundaries of the two figures. All transistors are enhancement-mode field effect transistors. The p-channel FETs having source connections to a short piece of bus in FIG. 1b are connected to a voltage source of a value associated with LOGIC ONE which is relatively positive compared to reference ground associated with LOGIC ZERO. The sticky bit is defined to be the LOGIC OR response to all the bits shifted out by the simple shift right during floating point denormalization and is required in order to maintain accuracy in floating point calculations. The bits appearing on a bit-place busses 40, 41 and 42 are conditionally ORed in apparatus 100 to generate the sticky bit at sticky bit output terminal 101 after precharge.

The pre-charge pulse conditions the channel of n-channel FET 102 for conduction to clamp node 103 to ground or ZERO condition. The positive-going pre-charge pulse at the same time renders non-conductive the transmission gate comprising p-channel FET 104 and n-channel FET 105. The gate electrode of p-channel FET 104 is back-biased directly by the positive-going pre-charge pulse, and the gate electrode of n-channel FET 105 is back-biased by a negative-going pulse that a logic inverter 106 supplies at its output port in response to the pre-charge pulse applied to its input port. The absence of conduction through the channels of FETs 104 and 105 disconnects node 103 from the sticky bit output terminal 101 during pre-charge.

A logic inverter 107 responds to the positive-going pulse applied to its input port to supply a negative-going pulse from its output port to the gate electrodes of a n-channel FETs 108, 109 and 110, which have their source electrodes at ground or ZERO level, and to the gate electrodes of p-channel FETs 111, 112 and 113, which have their source electrodes at a positive potential or ONE level. This negative-going pulse conditions the channels of FETs 108, 109 and 110 to be nonconducting. It also conditions the channels of FETs 111, 112 and 113 to conduct, to clamp the gate electrodes of p-channel FETs 114, 115 and 116 to the ONE level at the source electrodes of FETs 111, 112 and 113. This conditions the channels of the FETs 114, 115 and 116 to be nonconducting. Irrespective of the conduction of the channels of p-channel FETs 117, 118 and 119, then, there is no path for current to pull up node 103 against the clamping action of the conductive channel of n-channel FET 102 during pre-charge.

When the pre-charge pulse subsides to leave connection PC at ZERO, the gate electrode of FET 102 is no longer forward-biased to maintain conduction through the channel of FET 102. The p-channel FET 104 returns to conduction as its gate electrode is forward-biased by returning to ZERO, and the ONE logic inverter 106 supplies in response to its input signal returning to ZERO forward-biases the gate electrode of n-channel FET 105 to return it to conduction. Sticky bit output terminal 101 is thus selectively connected once again to node 103, pre-charged to ZERO.

When the pre-charge pulse subsides, the output signal of logic inverter 107 rises to a ONE. This reverse-biases the gate electrodes of p-channel FETs 111, 112 and 113 to render their channels non-conductive. This also forward-biases the gate electrodes of n-channel FETs 108, 109 and 110 conditioning their channels to be conductive.

Responsive to a one-bit shift command appearing on shift control bus 61, a grounded-source-electrode n-channel FET 120 is biased at its gate electrode for conditioning its channel to conduct and clamp the gate electrode of p-channel FET 114 to ground. FET 114 channel becomes conducting. A ONE appearing on bit-place bus 40 and thus being applied to the input port of logic inverter 91 will cause a ZERO to appear at the output of logic inverter 91. This ZERO will forward-bias p-channel FET 117 to cause conduction of its channel. The simultaneous conduction of FETs 114 and 117 clamp potential at node 103 to ONE level, so the sticky bit output terminal 101 rises to ONE also inasmuch as the transmission gate comprising FETs 105 and 106 is conducting.

A ZERO on bit-place bus 40 will cause a ONE to be applied to the gate electrode of FET 117 keeping its channel from conducting. When a ONE as shift command appears on shift control bus 61 and ZEROs appear on shift control busses 62 and 63, grounded-source-electrode n-channel FETs 121–125 are not forward-biased. The non-conduction of the channels of FETs 122 and 124 leaves the ONE precharge on the gate electrode of FET 112, biasing FET 112 for non-conduction, so any conduction of FET 118 channel is ineffectual to raise the potential at node 103. The non-conduction of the channel of FET 125 leaves the ONE pre-charge on the gate electrode of FET 116, biasing FET 116 for non-conduction, so any conduction of FET channel 119 is ineffectual to raise the potential at node 103.

Responsive to a two-bit shift command appearing on control bus 62, grounded-source-electrode n-channel FETs 121 and 122 are biased into conduction to forward-bias FETs 114 and 115 and condition their channels for conduction. FET 125 is non-conductive to leave the ONE precharge on the gate electrode of FET 116, maintaining it non-conducting. The conduction of FET 114 channel permits any conduction of FET 117 channel at the same time to raise the potential at node 103 to a ONE. Such conduction of FET 117 channel will occur responsive to a ZERO being applied to its gate electrode by the logic inverter 91 in response to a ONE appearing on binary bus 40 rather than a ZERO. The conduction of FET 115 channel permits any conduction of FET channel 118 at the same time to raise the potential at node 103. Such conduction of FET 118 channel will occur responsive to a ZERO being applied to its gate electrode by the logic inverter 92 in response to a ONE appearing on bit-place bus 41 rather than a ZERO. Node 103 accordingly supplies to sticky bit output terminal 101 an OR response to the bits on binary-place busses 40 and 41.

Responsive to a three-bit shift command appearing in control bus 63, grounded-source-electrode n-channel FETs 123–125 are biased into conduction to forward-bias FETs 114–116 respectively and condition their channels for conduction. The conduction of FET 114 channel permits any conduction of FET 117 channel at the same time to raise the potential at node 103 to a ONE. Such conduction of FET 117 channel will occur responsive to a ZERO being applied to its gate electrode by the logic inverter 91 in response to a ONE appearing on binary place bus 40 rather than a ZERO. The conduction of FET 115 channel permits any conduction of FET channel 118 at the same time to raise the potential at node 103. Such conduction of FET 118 channel will occur responsive to a ZERO being applied to its gate electrode by the logic inverter 92 in response to a ONE appearing on bitplace bus 41 rather than a ZERO. The conduction of FET 116 channel permits any conduction of FET 119 channel at the same time to raise the potential at node 103 to a ONE. Such conduction of FET 119 will occur responsive to a ZERO being applied to its gate electrode by the logic inverter 93 in response to a ONE appearing on binary-place bus 42 rather than a ZERO. Node 103 accordingly supplies to sticky output terminal 101 an OR response to the bits on binary-place busses 40, 41 and 42.

What is claimed is:

1. A data shifter for binary data having a plurality n in number of bit places, said data shifter comprising:
    a first plurality of binary-place busses respectively identified by consecutive ordinal numbers zeroeth through $(n-1)^{th}$;
    a second plurality of further binary-place busses also respectively identified by consecutive ordinal numbers zeroeth through $(n-1)^{th}$;
    a plurality of input selectors respectively identified by consecutive ordinal numbers zeroeth through $(n-1)^{th}$ for selecting respective bit pieces of input data to correspondingly identified binary-place busses in said first plurality thereof during shifts towards increased significance and to correspondingly identified further binary-place busses in said second plurality during shifts towards decreased significance;
    a plurality of output selectors identified by consecutive ordinal numbers zeroeth through $(n-1)^{th}$ for selecting respective bit places of output data from correspondingly identified further binary-place busses in said second plurality thereof during shifts towards increased significance and from correspondingly identified binary-place busses in said first plurality thereof during shifts towards decreased significance;
    a plurality $n^2$ in number of switches, respective ones of said switches selectively connecting each of said first plurality of binary place busses to each of said second plurality of further binary place busses, as controlled by respective control signals received by said switches;
    a plurality of shift control busses respectively identified by consecutive ordinal numbers zeroeth through $(n-1)^{th}$, each shift control bus connected for applying control signals to those of said switches selectively connecting a binary-place bus in said first plurality to a further binary-place bus in said second plurality with identification number larger than its own by the identification number of that shift control bus;
    means for issuing a shift command to only a selected one of said shift control busses;
    a plurality of rotation control busses respectively identified by consecutive ordinal numbers first through $(n-1)^{th}$, each rotation control bus connected for applying control signals to those of said switches selectively connecting a further binary place bus in said second plurality to a binary-place bus in said first plurality with identification number larger than its own by the identification number of that rotation control bus;
    means, responsive, only whenever a rotation enable signal is supplied thereto, to a shift command appearing on one of said first through $(n-1)^{th}$ shift control busses, for generating a rotation command on the rotation control bus with identification number corresponding to that of the shift control bus on which said shift command appears; and
    means for supplying a respective fill bit to each said binary-place bus and further binary place bus in said first and second pluralities thereof that is neither currently selected by one of said input selectors nor is currently connected by one of said switches to a binary-place bus in said first and second pluralities thereof that is currently selected by one of said input selectors.

2. A data shifter for binary data having a plurality n in number of bit places, said data shifter comprising:
    a first plurality of binary-place busses respectively identified by consecutive ordinal numbers zeroeth through $(n-1)^{th}$;
    a second plurality of further binary-place busses also respectively identified by consecutive ordinal numbers zeroeth through $(n-1)^{th}$;
    a plurality of input selectors respectively identified by consecutive ordinal numbers zeroeth through $(n-1)^{th}$ for selecting respective bit places of input data to correspondingly identified binary-place busses in said first plurality thereof during shifts towards increased significance and to correspondingly identified further binary-place busses in said second plurality during shifts towards decreased significance;
    a plurality of output selectors respectively identified by consecutive ordinal numbers zeroeth through $(n-1)^{th}$ for selecting respective bit places of output data from correspondingly identified further binary-place busses in said second plurality thereof during shifts towards increased significance and from correspondingly identified binary-place busses in said first plurality thereof during shifts towards decreased significance;
    a plurality $n^2$ in number of switches, respective ones of said switches selectively connecting each of said first plurality of binary place busses to each of said second plurality of further binary place busses, as controlled by respective control signals received by said switches;
    a plurality of shift control busses respectively identified by consecutive ordinal numbers zeroeth through $(n-1)^{th}$, each shift control bus connected for applying control signals to those of said switches selectively connecting a binary-place bus in said first plurality to a further binary-place bus in said second plurality with identification number larger than its own by the identification number of that shift control bus;
    means for issuing a shift command to only a selected one of said shift control busses;
    a plurality of rotation control busses respectively identified by consecutive ordinal numbers first through $(n-1)^{th}$, each rotation control bus connected for applying control signals to those of said switches selectively connecting a further binary place bus in said second plurality to a binary-place bus in said first plurality with identification number larger than its own by the identification number of that rotation control bus;

means, responsive, only whenever a rotation enable signal is supplied thereto, to a shift command appearing on one of said first through $(n-1)^{th}$ shift control busses, for generating a rotation command on the rotation control bus with identification number corresponding to that of the shift control bus on which said shift command appears;

means for supplying a respective fill bit to each said binary-place bus and further binary place bus in said first and second pluralities thereof that neither currently is selected by one of said input selectors nor is currently connected by one of said switches to a binary-place bus or further binary place bus in said first and second pluralities thereof that is currently selected by one of said input selectors; and means for generating a sticky bit comprising:

respective means for performing logic corresponding to each of said zeroeth through $(n-2)^{th}$ further binary-place busses in said second plurality thereof, being identified by the same ordinal numbers as the further binary-place busses with which said means for performing logic respectively correspond, having respective outputs in an OR connection with each other to supply said sticky bit, each said means for performing logic responding to a ONE appearing on a correspondingly identified further binary-place bus concurrently with a shift command appearing on any of the shift control busses identified by an ordinal number higher than that by which that said means for performing logic is itself identified to cause said sticky bit to be a ONE; and means for otherwise causing said sticky bit to be a ZERO.

3. A method for operating a barrel-shift data shifter structure including a matrix of switches, said method including the steps of:

segregating switches within said matrix of switches into a first set which participate in a simple shift as well as a barrel shift and into a second set which participate only in a barrel shift;

controlling said first set of switches with shift control signals alone; and controlling said second set of switches with responses to said shift control signals only in the presence of an additional rotation enable signal.

* * * * *